United States Patent
Oh

(10) Patent No.: US 11,884,162 B2
(45) Date of Patent: Jan. 30, 2024

(54) SYSTEM AND METHOD FOR CONTROLLING MOTORS OF COMMERCIAL VEHICLE HAVING ELECTRIC AXLE

(71) Applicants: HYUNDAI MOTOR COMPANY, Seoul (KR); KIA CORPORATION, Seoul (KR)

(72) Inventor: June Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 162 days.

(21) Appl. No.: 17/501,339

(22) Filed: Oct. 14, 2021

(65) Prior Publication Data

US 2022/0324334 A1 Oct. 13, 2022

(30) Foreign Application Priority Data

Apr. 13, 2021 (KR) .................. 10-2021-0047593

(51) Int. Cl.
  *G06F 17/00* (2019.01)
  *B60L 15/34* (2006.01)
  *B60L 15/20* (2006.01)

(52) U.S. Cl.
  CPC .......... *B60L 15/34* (2013.01); *B60L 15/2036* (2013.01); *B60L 15/2045* (2013.01);
  (Continued)

(58) Field of Classification Search
  CPC .. B60L 15/34; B60L 15/2036; B60L 15/2045; B60L 2200/36; B60L 2240/423;
  (Continued)

(56) References Cited

U.S. PATENT DOCUMENTS 8,708,074 B1 * 4/2014 McCoy .................... B60K 6/52
  180/65.285
9,403,446 B2 * 8/2016 Hashizaka ................ B60L 3/12
  (Continued)

FOREIGN PATENT DOCUMENTS

EP  1752349 A1 *  2/2007  ............ B60T 8/1755

OTHER PUBLICATIONS

Driving Torque Control of Dual-Motor Powertrain for Electric Vehicles (Year: 2022).*

*Primary Examiner* — Ronnie M Mancho
(74) *Attorney, Agent, or Firm* — Morgan, Lewis & Bockius LLP

(57) ABSTRACT

A motor control system for a commercial vehicle having an electric axle includes: first and second motors disposed in a rear-wheel electric axle; an accelerator position sensor for detecting a degree to which an accelerator is depressed; a wheel speed sensor detecting a wheel speed change; and a controller determining a driver's required torque on the basis of detection signals of the accelerator position sensor and the wheel speed sensor and then controlling a torque of the first motor in such a manner as to approach target torque for satisfying the driver's required torque and at the same time either controlling either a torque of the second motor to a level that compensates for a torque error of the first motor or controlling the torque of the first motor and the torque of the second motor at alternating fixed duty ratios.

12 Claims, 11 Drawing Sheets

(52) U.S. Cl.
CPC ..... *B60L 2200/36* (2013.01); *B60L 2240/423* (2013.01); *B60L 2240/425* (2013.01); *B60L 2240/461* (2013.01); *B60L 2250/28* (2013.01)

(58) Field of Classification Search
CPC ......... B60L 2240/425; B60L 2240/461; B60L 2250/28; B60L 2220/42; B60L 15/20; B60L 50/75; B60K 1/02; B60K 17/22; B60K 26/021; B60Y 2200/145; B60Y 2200/91; B60Y 2304/05; B60Y 2400/3032; Y02T 90/40
USPC .......................................................... 701/22
See application file for complete search history.

(56) References Cited

U.S. PATENT DOCUMENTS

| | | | | |
|---|---|---|---|---|
| 9,707,944 | B2* | 7/2017 | Doi | B60T 8/1766 |
| 10,144,284 | B2* | 12/2018 | Christensen | B60K 23/08 |
| 11,338,673 | B1* | 5/2022 | McCoy | B60K 1/04 |
| 11,446,996 | B2* | 9/2022 | Gaither | B60G 17/015 |
| 2007/0051554 | A1* | 3/2007 | Thacher | B60T 8/1755 |
| | | | | 180/445 |
| 2021/0129650 | A1* | 5/2021 | Gaither | B60K 1/00 |
| 2022/0185246 | A1* | 6/2022 | Szuck | B60T 8/171 |
| 2022/0324334 | A1* | 10/2022 | Oh | B60L 15/34 |

* cited by examiner

-PRIOR ART-

-PRIOR ART-

-PRIOR ART-

-PRIOR ART-

−PRIOR ART−

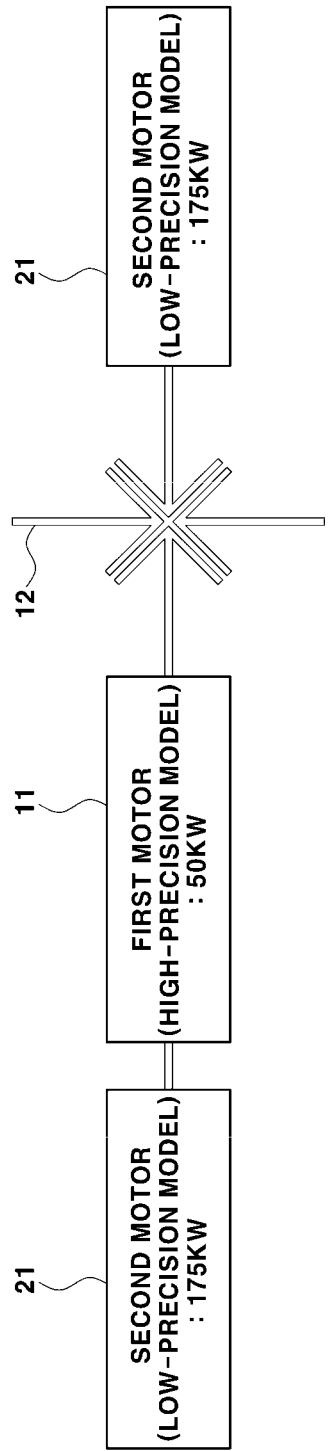

SYSTEM AND METHOD FOR CONTROLLING MOTORS OF COMMERCIAL VEHICLE HAVING ELECTRIC AXLE

CROSS REFERENCE TO RELATED APPLICATION

The present application claims the benefit of priority to Korean Patent Application No. 10-2021-0047593, filed Apr. 13, 2021, the entire contents of which is incorporated herein for all purposes by this reference.

TECHNICAL FIELD

The present disclosure relates to a motor control system and a motor control method for a commercial vehicle having an electric axle, and more particularly, to a motor control system and a motor control method for a commercial vehicle having an electric axle, in both of which two or more motors having different specifications are mounted on the electric axle.

BACKGROUND

Environment-friendly passenger vehicles, such as electric vehicles and hydrogen fuel cell vehicles, have been released on the market. Environment-friendly commercial vehicles equipped with an electric-axle assembly, such as battery electric trucks or hydrogen fuel cell trucks, have also been under development.

FIG. 1 is a schematic view illustrating a power train of a hydrogen fuel cell truck among commercial vehicles having an electric axle according to a related art.

As illustrated in FIG. 1, the hydrogen fuel cell truck among the commercial vehicles having the electric axle includes a fuel cell 30 generating electric energy and a battery 40 charged with the electric energy generated by the fuel cell 30.

In addition, the hydrogen fuel cell truck has a structure where in addition to front wheels arranged in the front side thereof, a pair of rear wheels as drive wheels is arranged in the rear side thereof. A first electric axle 10 is mounted on a front rear-wheel in the pair of rear wheels, and a second electric axle 20 is mounted on a rear rear-wheel in the pair of rear wheels.

The rear-wheel first electric axle 10 may be configured to include an axle housing, a first motor 11, a first axle shaft 12, a first wheel 13, and the like. The first motor 11 is mounted within the axle housing and is driven with the electric energy of the fuel cell 30 or the battery 40. The first axle shaft 12 is connected to an output shaft of the first motor 11. The first wheel 13 is mounted on both end portions of the first axle shaft 12.

The rear-wheel second electric axle 20 may also be configured to include an axle housing, a second motor 21, a second axle shaft 22, a second wheel 23, and the like. The second motor 21 is mounted within the axle housing and is driven with the electric energy of the fuel cell 30 or the battery 40. The second axle shaft 22 is connected to an output shaft of the second motor 21. The second wheel 23 is mounted on both end portions of the second axle shaft 22.

At this point, the first motor 11 and the second motor 21 may have the same capacity specification.

For example, as illustrated in FIG. 2A, the first motor 11 and the second motor 21 are employed as high-priced high-performance modes capable of outputting a maximum torque of 1400 Nm.

Depending on a type of truck, the hydrogen fuel cell truck may have a structure where in addition to a front wheel arranged in the front side thereof, one rear wheel as a drive wheel is arranged in the rear side thereof. An electric axle having the first motor 11 and the second motor 21 that output torque to one axle shaft may be mounted on one rear wheel as a drive wheel. The first motor 11 and the second motor 21 of this electric axle, as illustrated in FIG. 2B, are employed as high-priced high-performance models, respectively, that are capable of outputting a maximum torque of 1400 Nm.

An example of torque control on the first motor 11 and the second motor 21, employed as the high-priced high-performance models, will be described below with reference to FIGS. 3 and 4.

A vehicle controller that is a high-level control determines a driver's required torque that depends on the degree to which a driver depresses an accelerator and transmits a torque command corresponding to the determined driver's required torque to a motor controller. Then, a motor controller performs the torque control on the first motor and the second motor.

As an example of the torque control on the first motor 11 and the second motor 21, torque of the first motor 11 and torque of the second motor 21 are controlled in a manner that is distributed in the same ratio, in such a manner that the sum of the torque output by the first motor 11 and the torque output by the second motor 21 becomes equal to the driver's required torque.

For example, as illustrated in FIG. 3, when the driver's required torque is in a low-output requirement section of 200 Nm, the torque of each of the first motor and the second motor is controlled to 100 Nm. Furthermore, when the driver's required torque is in a high-output requirement section of 2000 Nm, the torque of each of the first motor 11 and the second motor 21 is controlled to 1000 Nm.

As another example of the torque control on the first motor 11 and the second motor 21, the torque of the first motor and the torque of the second motor are controlled in a manner that is distributed in different ratios or in the same ratio, in such a manner that the torque of the first motor 11, the torque of the second motor 21, or the sum of the torque of the first motor 11 and the torque of the second motor 21 becomes the driver's required torque.

For example, as illustrated in FIG. 4, when the driver's required torque in the low-output requirement section is 200 Nm, only the torque of the first motor 11 is controlled to 200 Nm. When the driver's required torque in the high-output requirement section is 2000 Nm, the torque of each of the first motor and the second motor 21 is controlled to 1000 Nm.

However, employing high-priced high-performance models for the first motor 11 and the second motor 21 has the following disadvantages.

Firstly, the torque of the first motor 11 and the torque of the second motor 21 are not exactly output in such a manner as to reach target torque for satisfying the driver's required torque.

For example, when the torque of the first motor 11 and the torque of the second motor 21 are output, an error of ±5% with respect to the target torque (for example, approximately ±10 Nm with respect to a target of 200 Nm) occurs. This error is not corrected, and thus, the torque of the first motor 11 and the torque of the second motor 21 does not exactly approach the target torque.

Secondly, the first motor 11 and the second motor 21 have the limitation that maximum torque is used only for a limited short time.

For example, when a loaded vehicle parked on an uphill road starts to drive after ignition, both the maximum torque of the first motor 11 and the maximum torque the second motor 21 can be used for approximately 30 seconds.

Thirdly, employing high-performance high-precision models for the first motor 11 and the second motor 21 increases the cost in developing and manufacturing the commercial vehicles such as the hydrogen fuel cell trucks.

The foregoing is intended merely to aid in the understanding of the background of the present disclosure, and is not intended to mean that the present disclosure falls within the purview of the related art that is already known to those skilled in the art.

SUMMARY

The present disclosure is to provide a motor control system and a motor control method for a commercial vehicle having an electric axle. In a low-output requirement section, the motor control system and the motor control method are capable of controlling torque of a first motor included in a rear-wheel electric axle in such a manner as to approach target torque and controlling torque of a second motor included in the rear-wheel electric axle to a level that compensates for a torque error of the first motor. In a high-output requirement section, the motor control system and the motor control method are capable of controlling the torque of the first motor and the torque of the second motor at alternating fixed duty ratios. Thus, not only can a driver's required torque be satisfied, but also a maximum-torque usage time for each of the first motor and the second motor can be increased.

According to an aspect of the present disclosure, there is provided a motor control system for a commercial vehicle having an electric axle, the motor control system including: a first motor and a second motor disposed in a rear-wheel electric axle; an accelerator position sensor for detecting a degree to which an accelerator is depressed; a wheel speed sensor detecting a wheel speed change; and a controller determining a driver's required torque on the basis of detection signals of the accelerator position sensor and the wheel speed sensor, respectively, and then controlling a first motor torque of the first motor in such a manner as to approach a target torque for satisfying the driver's required torque and at the same time either controlling a second motor torque of the second motor to a level that compensates for a torque error of the first motor or controlling the first motor torque and the second motor torque at alternating fixed duty ratios.

In the motor control system, the controller may include: a vehicle controller determining the driver's required torque on the basis of the detection signal of the accelerator position sensor and then applying to a motor controller a motor torque command for satisfying the driver's required torque; and the motor controller controlling the torque of the first motor on the basis of the motor torque command in such a manner as to approach the target torque and at the same time either controlling the torque of the second motor to a level that compensates for the torque error of the first motor or controlling the torque of the first motor and the torque of the second motor at the alternating fixed duty ratios.

In the motor control system, in a low-output requirement section, the controller may control the torque of the first motor in such a manner as to approach the target torque for satisfying the driver's required torque and at the same time may control the torque of the second torque to a level that compensates for the torque error of the first motor. Furthermore, in a high-output requirement section, the controller may control the torque of the first motor and the torque of the second motor at the alternating fixed duty ratios.

In the motor control system, when controlling the torque of the first motor and the torque of the second motor at the alternating fixed duty ratios, the controller may control a sum of the torque of the first motor and the torque of the second motor in such a manner as to become the driver's required torque.

In the motor control system, in a case where the rear-wheel electric axle is configured to include a rear-wheel first electric axle in which the first motor is included and a rear-wheel second electric axle in which the second motor is included, the first motor may be employed as a high-precision model that has higher precision than the second motor, in such a manner as to output the target torque for satisfying the driver's required torque, and the second motor may be employed as a low-precision model that has lower precision than the first motor, in such a manner as to output torque for compensating for the torque error of the first motor.

In the motor control system, in a case where the rear-wheel electric axle is configured as one electric axle in which the first motor and the second motor are included, the first motor may be employed as a high-precision model that has higher precision than the second motor, in such a manner as to output the target torque for satisfying the driver's required torque, and the second motor may be employed as a low-precision model that has lower precision than the first motor, in such a manner as to output torque for compensating for the torque error of the first motor.

According to another aspect of the present disclosure, there is provided a motor control method for a commercial vehicle having an electric axle, the method including: detecting, by an accelerator position sensor, a degree to which an accelerator is depressed; detecting, by a wheel speed sensor, a wheel speed change; determining, by a controller, a driver's required torque on the basis of detection signals of the accelerator position sensor and the wheel speed sensor; and upon determining the driver's required torque, controlling a first motor torque of a first motor disposed in a rear-wheel electric axle in such a manner as to approach a target torque for satisfying the driver's required torque, according to a magnitude of the determined driver's required torque and at the same time either controlling a second motor torque of a second motor disposed in the rear-wheel electric axle to a level that compensates for a torque error of the first motor or controlling the first motor torque and the second motor torque at alternating fixed duty ratios.

In the motor control method, in a case where a magnitude of the driver's required torque is determined to a level that requires a low motor-output, the torque of the first motor included in the rear-wheel electric axle may be controlled in such a manner as to approach the target torque for satisfying the driver's required torque, and at the same time the torque of the second motor included in the rear-wheel electric axle may be controlled to a level that compensates for the torque error of the first motor.

In the motor control method, in a case where a magnitude of the driver's required torque is determined to a level that requires a high motor-output, the torque of the first motor and the torque of the second motor may be controlled at alternating fixed duty ratios.

In the motor control method, when the torque of the first motor and the torque of the second motor are controlled at the alternating fixed duty ratios, a sum of the torque of the first motor and the torque of the second motor may be controlled in such a manner as to become the driver's required torque.

In the motor control method, when the torque of the first motor and the torque of the second motor are controlled at the alternating fixed duty ratios, a maximum-torque period for the first motor and a maximum-torque period for the second motor may be determined as being shorter than a time taken for a temperature of each motor to reach a maximum reference temperature.

The motor control system and the motor control method according to the present disclosure provide the following advantages.

Firstly, in the low-output requirement section, the torque of the first motor included in the rear-wheel electric axle is controlled in such a manner as to approach the target torque for satisfying the driver's required torque. At the same time, the torque of the second motor included in the rear-wheel electric axle is controlled to a level that compensates for the torque error of the first motor. Thus, the torque of the first motor and the torque of the second motor can be exactly output in such a manner as to reach the target torque for satisfying the driver's required torque.

Secondly, in the high-output requirement section, the torque of the first motor and the torque of the second motor are controlled at the alternating fixed duty ratios. Thus, not only can the driver's required torque be satisfied, but also a maximum-torque usage time for each of the first motor and the second motor can be increased more than in the related art.

Thirdly, only the first motor is employed as a high-priced high-precision model. The second motor is employed as a model that is lower-priced and has lower precision than the first motor, in such a manner as to output torque for compensating for the torque error of the first motor. Thus, cost saving can be achieved in developing and manufacturing commercial vehicles such as hydrogen fuel cell trucks.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 6A to 6E are schematic views each illustrating an arrangement of the first motor and the second motor that are included in the electric axle;

DETAILED DESCRIPTION

An exemplary embodiment of the present disclosure will be described in detail below with reference to the accompanying drawings.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On another hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

Figure 1:
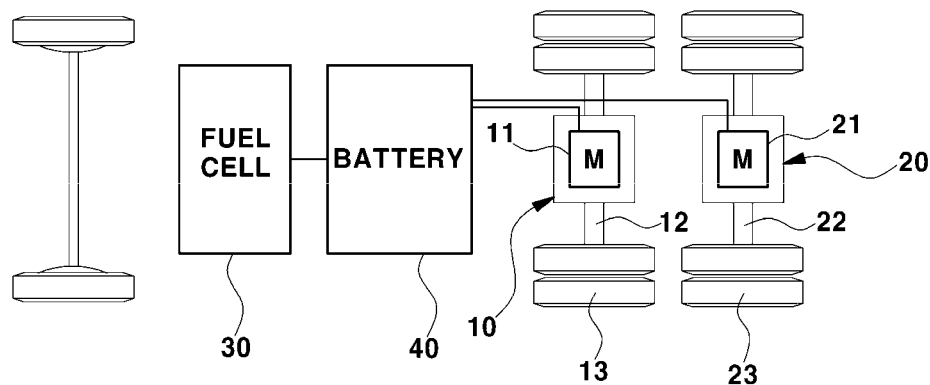
FIG. 1 is a schematic view illustrating a power train of a hydrogen fuel cell truck among commercial vehicles having an electric axle.
Figure 2A:
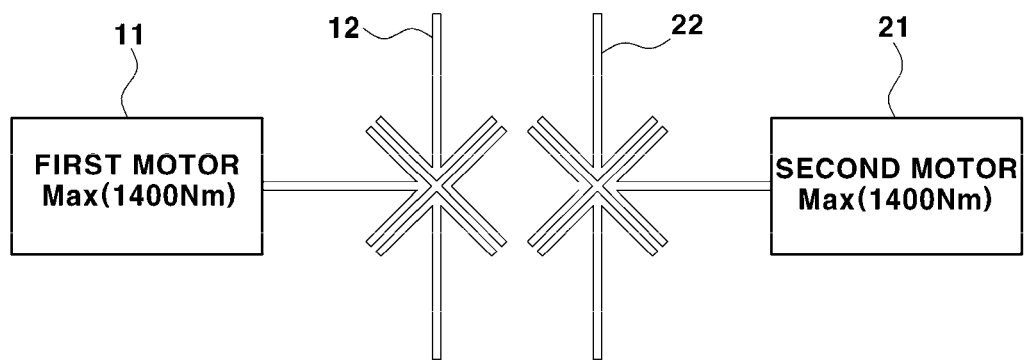
FIGS. 2A and 2B are schematic views each illustrating an example of an arrangement of a first motor and a second motor that are included in the electric axle of a commercial vehicle.
Figure 2B:
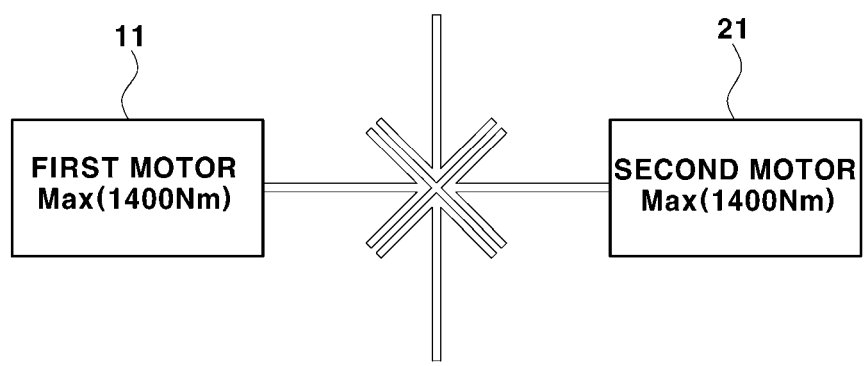
Figure 3:
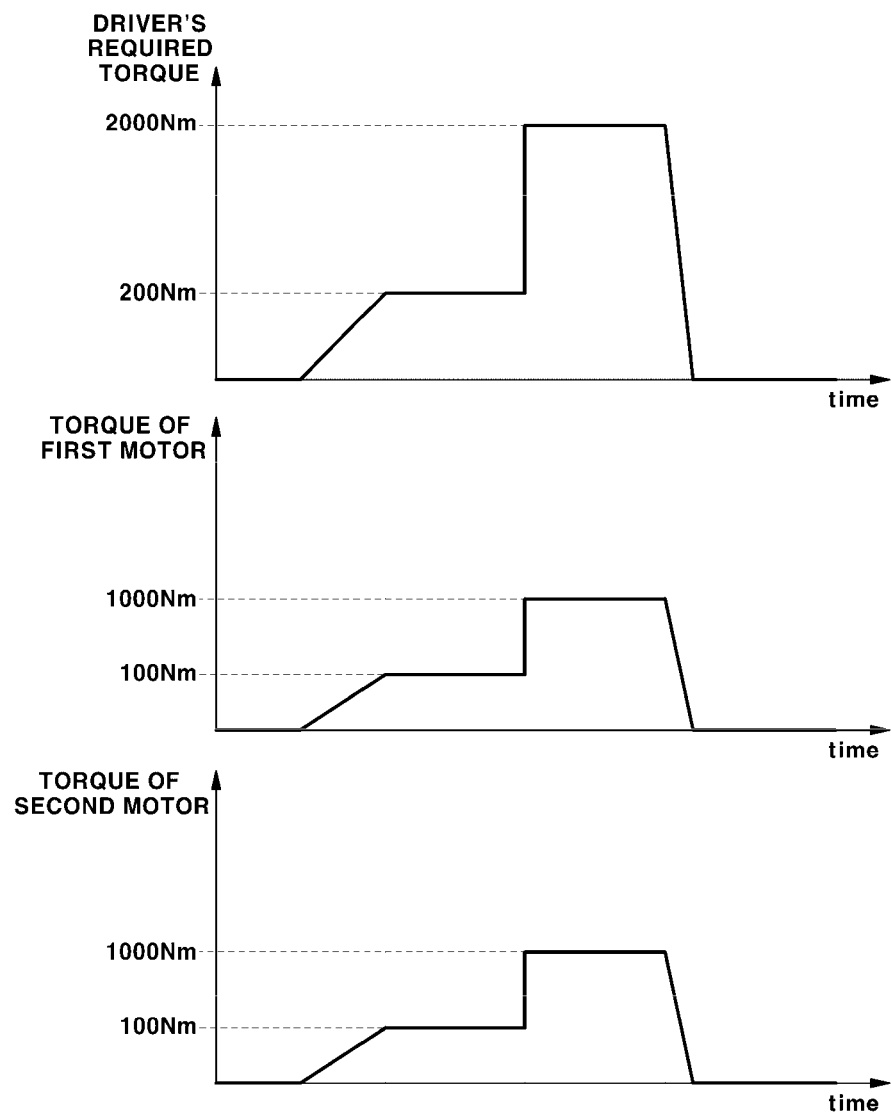
FIGS. 3 and 4 are graphs each illustrating an example of performing torque control on a first motor and a second motor that are included in an electric axle of a commercial vehicle in the related art.
Figure 4:
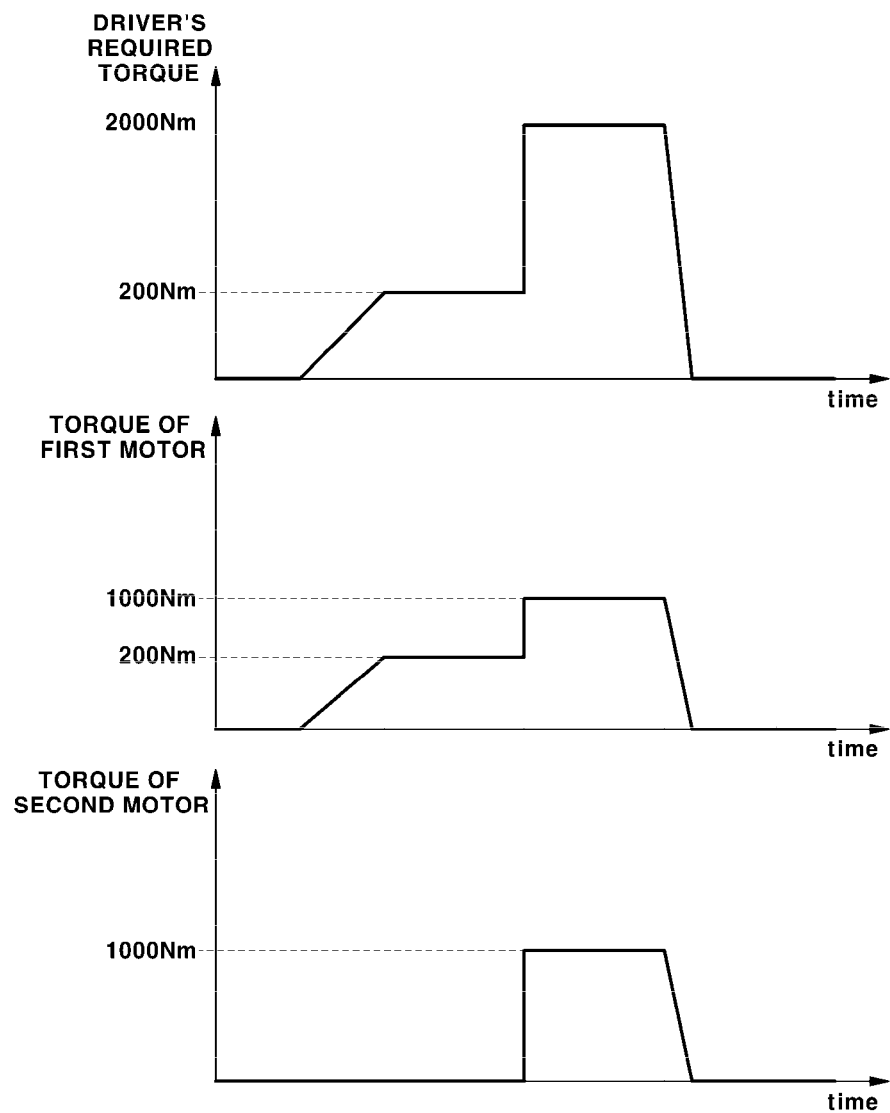
Figure 5:
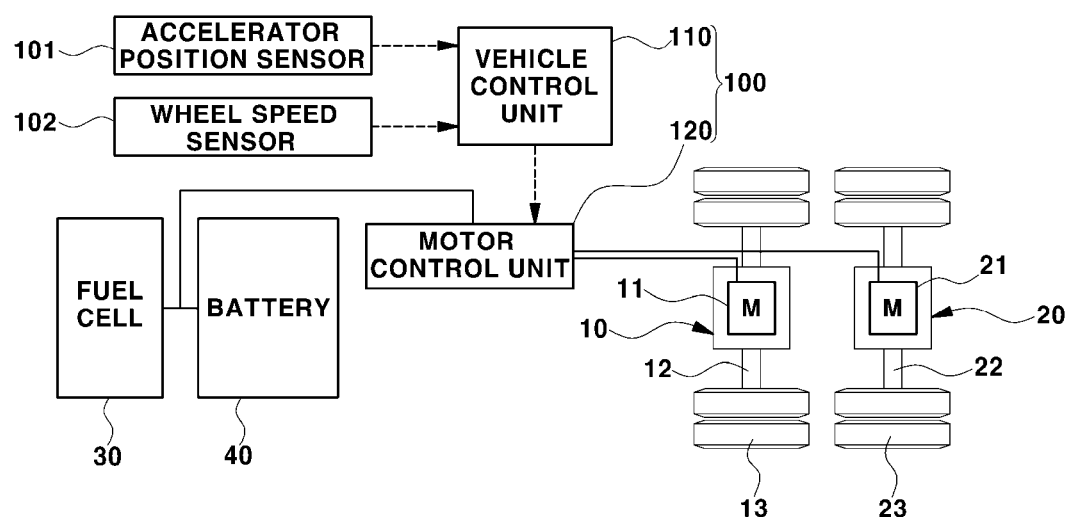
FIG. 5 is a view illustrating a configuration of a motor control system for a commercial vehicle having an electric axle according to the present disclosure.

FIG. 5 is a view illustrating a configuration of a motor control system for a commercial vehicle having an electric axle according to the present disclosure.

A hydrogen fuel cell truck among commercial vehicles having the electric axle, as illustrated in FIG. 5, includes a fuel cell 30 generating electric energy and a battery 40 charged with the electric energy generated by the fuel cell 30. The hydrogen fuel cell truck has a structure where in addition to front wheels arranged in the front side thereof, a pair of rear wheels as drive wheels is arranged in the rear side thereof. A first electric axle 10 is mounted on a front rear-wheel in the pair of rear wheels, and a second electric axle 20 is mounted on a rear rear-wheel in the pair of rear wheels.

The rear-wheel first electric axle 10 may be configured to include an axle housing, a first motor 11, a first axle shaft 12, a first wheel 13, and the like. The first motor 11 is mounted within the axle housing and is driven with the electric energy of the fuel cell 30 or the battery 40. The first axle shaft 12 is connected to an output shaft of the first motor 11. The first wheel 13 is mounted on both end portions of the first axle shaft 12.

The rear-wheel second electric axle 20 may also be configured to include an axle housing, a second motor 21, a second axle shaft 22, a second wheel 23, and the like. The second motor 21 is mounted within the axle housing and is driven with the electric energy of the fuel cell 30 or the battery 40. The second axle shaft 22 is connected to an output shaft of the second motor 21. The second wheel 23 is mounted on both end portions of the second axle shaft 22.

The motor control system for the commercial vehicle having the electric axle according to the present disclosure, as illustrated in FIG. 5, is configured to include an accelerator position sensor (APS) 101, a wheel speed sensor 102, a controller 100, and the like. The controller 100 performs torque control on the first motor 11 of the rear-wheel first electric axle 10 or the torque control on the second motor 21 of the rear-wheel second electric axle 20, on the basis of a signal of the accelerator position sensor 101.

The accelerator position sensor 101 outputs an electric signal, which varies according to the degree to which a driver depresses an accelerator, to the controller 100.

The wheel speed sensor 102 detects a wheel speed change and outputs the detected wheel speed change to the controller 100.

The controller 100 may be configured as one integrated controller. The controller 100, configured as one integrated controller, determines a driver's required torque on the basis of signals of the accelerator position sensor 101 and the wheel speed sensor 102, and controls torque of the first motor 11 according to the determined driver's required torque in such a manner as to approach target torque for satisfying the driver's required torque. At the same time, the controller 100 controls torque of the second motor 21 to a level that compensates for a torque error of the first motor 11 or controls the torque of the first motor 11 and the torque of the second motor 21 at alternating fixed duty ratios.

In addition, the controller 100 may be configured to include a vehicle controller 110 and a motor controller 120. The vehicle controller 110, which is a high-level controller, determines the driver's required torque on the basis of detection signals of the accelerator position sensor 101 and the wheel speed sensor 102, and then applies a motor torque command for satisfying the driver's required torque to the motor controller 120. The motor controller 120 controls the torque of the first motor 11 on the basis of the motor torque command in such a manner as to approach a target torque, and at the same time, controls the torque of the second motor 21 to a level that compensates for the torque error of the first motor 11 or controls the torque of the first motor 11 and the torque of the second motor 21 at the alternating fixed duty ratios. The vehicle controller 110 and the motor controller 120 are collectively referred to here as a controller to help understand the present disclosure. In the present disclosure, the controller 100 may include a computer or processor such as a CPU or an electronic control unit (ECU) configured to be programmed to control various electronic devices.

In the present disclosure, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned disclosure can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present disclosure, each operation described above may be performed by a control device, and the control device may be configured by multiple control devices, or an integrated single control device.

In an exemplary embodiment of the present disclosure, the control device may be implemented in a form of hardware or software, or may be implemented in a combination of hardware and software.

In addition, the controller 100 is configured to control the torque of the first motor 11 in such a manner as to approach the target torque for satisfying the driver's required torque and at the same time to control the torque of the second motor 21 to a level that compensates for the torque error of the first motor 11, in a low-output requirement section that is determined according to a magnitude of the driver's required torque.

In addition, the controller 100 is configured to control the torque of the first motor 11 and the torque of the second motor 21 at the alternating fixed duty ratios, in a high-output requirement section that is determined according to the magnitude of the driver's required torque.

At this point, when controlling the torque of the first motor 11 and the torque of the second motor 21 at the alternating fixed duty ratios in the high-output requirement section, the controller 100 performs the control in such a manner that the sum of the torque of the first motor 11 and the torque of the second motor 21 become the driver's required torque.

In a case where the rear-wheel electric axle is configured to include the rear-wheel first electric axle 10 in which the first motor 11 is included, and the rear-wheel second electric axle 20 in which the second motor 21 is included, the first motor 11 may be employed as a high-precision model that has higher precision than the second motor 21, in such a manner as to output the target torque for satisfying the driver's required torque. Furthermore, the second motor 21 only needs to output torque of small magnitude for compensating for the torque error of the first motor 11 and to output torque at the alternating fixed duty ratios along with the first motor 11. Therefore, the second motor 21 may be employed as a low-precision model that has lower precision than the first motor 11 to achieve the cost saving in developing and manufacturing the hydrogen fuel cell truck.

Figure 6A:
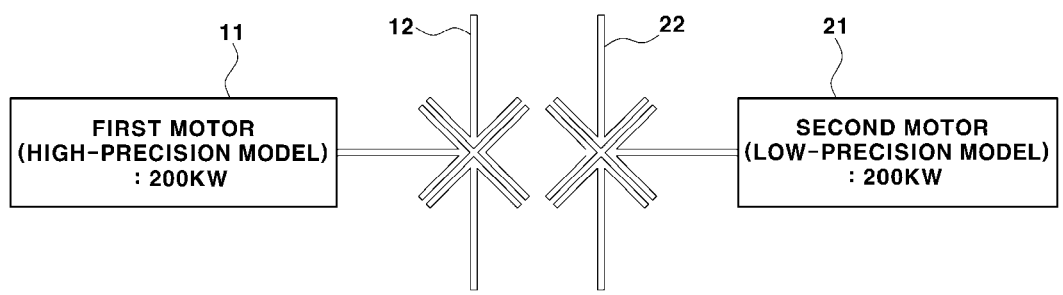

For example, as illustrated in FIG. 6A, the first motor 11 outputting torque to the first axle shaft 12 may be employed as a high-priced model (for example, a surface permanent magnet (SPM) motor or an interior permanent magnet (IPM) motor) that has a specification for outputting a maximum of 200 KW and has higher performance than the second motor 21. Furthermore, the second motor 21 outputting torque to the second axle shaft 22 may be employed as a model (for example, an induction motor (IM), a switched reluctance motor (SRM), or a synchronous reluctance motor (SynRM)) that also has the specification for outputting a maximum of 200 KW but is lower-priced than the first motor 11.

Figure 6B:
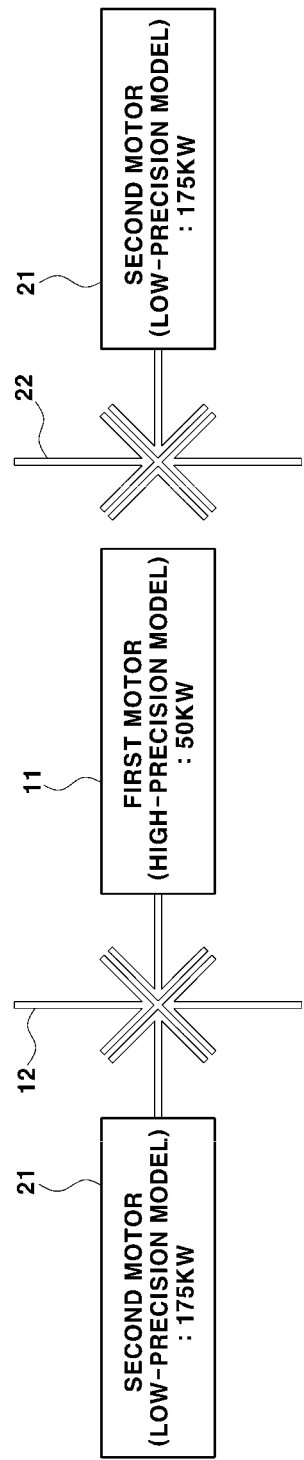

In addition, as illustrated in FIG. 6B, the first motor 11 outputting the torque to the first axle shaft 12 may be employed as a high-precision model that has a specification for outputting a maximum of 50 KW and has higher precision than the second motor 21. Furthermore, the second motor 21 may be configured to include two motors, as low-precision models that have lower precision than the first motor 11 and have a specification for outputting a maximum of 175 KW. These two motors output torque to the first axle shaft 12 and the second axle shaft 21, respectively.

Figure 6C:
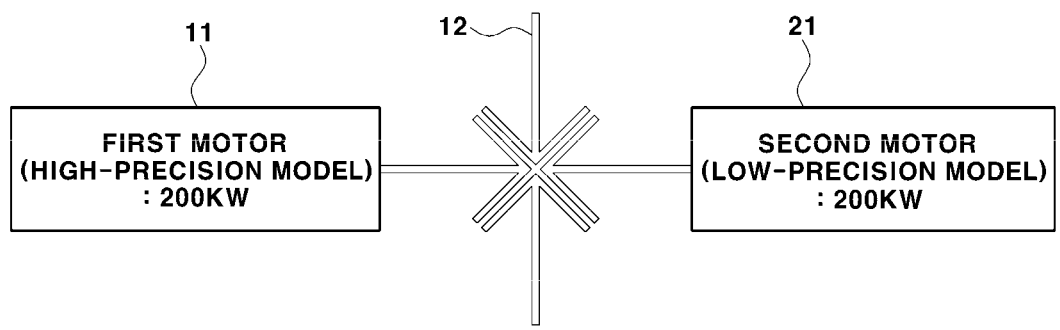
Figure 6D:
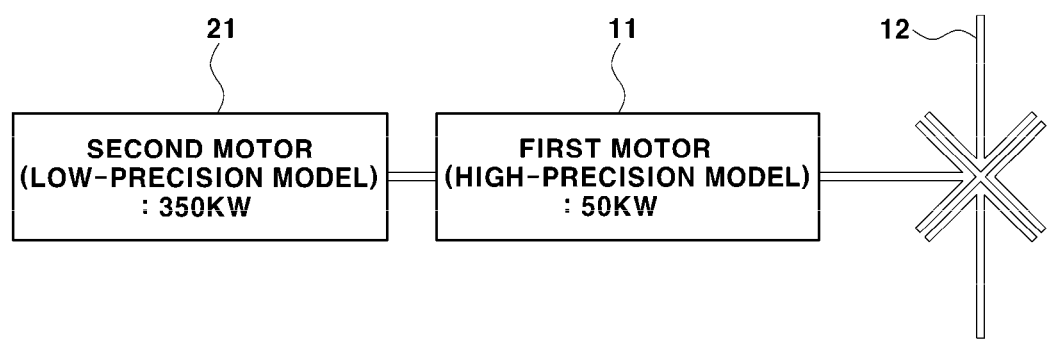

In a case where the rear-wheel electric axle, as illustrated in FIGS. 6C, 6D, and 6E, is configured as one electric axle including the first motor 11 and the second motor 21 that outputs torque to one axle shaft, the first motor 11 may also be employed as a high-precision model that has higher precision than the second motor 21, in such a manner as to output the target torque for satisfying the driver's required torque. Furthermore, the second motor 21 only needs to output the torque of small magnitude for compensating for the torque error of the first motor 11 and to output torque at the alternating fixed duty ratios along with the first motor 11. Therefore, the second motor 21 may be employed as a low-precision model that has lower precision than the first motor 11 to achieve the cost saving in developing and manufacturing the hydrogen fuel cell truck.

For example, as illustrated in FIG. 6C, the first motor 11 outputting torque to one axle shaft may be employed as a high-precision model (for example, the surface permanent magnet (SPM) motor or the interior permanent magnet (IPM) motor) that has a specification for outputting a maximum of 200 KW and has higher precision than the second motor 21. Furthermore, the second motor 21 outputting torque to one axle shaft may be employed as a low-precision model (for example, the induction motor (IM), the switched reluctance motor (SRM), or the synchronous reluctance motor (SynRM) that has a specification of outputting a maximum of 200 KW but has lower precision than the first motor 11.

In addition, as illustrated in FIG. 6D, the first motor 11 outputting torque to one axle shaft may be employed as a high-precision model that has a specification for outputting a maximum of 50 KW and has higher precision than the second motor 21. Furthermore, the second motor 21 may be employed as a low-precision model that has lower precision than the first motor 11 and has a specification for outputting a maximum of 350 KW.

In addition, as illustrated in FIG. 6E, the first motor 11 outputting torque to one axle shaft may be employed as a high-precision model that has a specification for outputting a maximum of 50 KW and has higher precision than the second motor 21. Furthermore, the second motor 21 may be configured to include two motors, as low-precision models that have lower precision than the first motor 11 and have a specification for outputting a maximum of 175 KW. Each of these two motors outputs torque to one axle shaft.

A motor control method for a commercial vehicle having an electric axle according to the present disclosure, which is based on the above-described system configuration, will be described in detail below.

Figure 7:
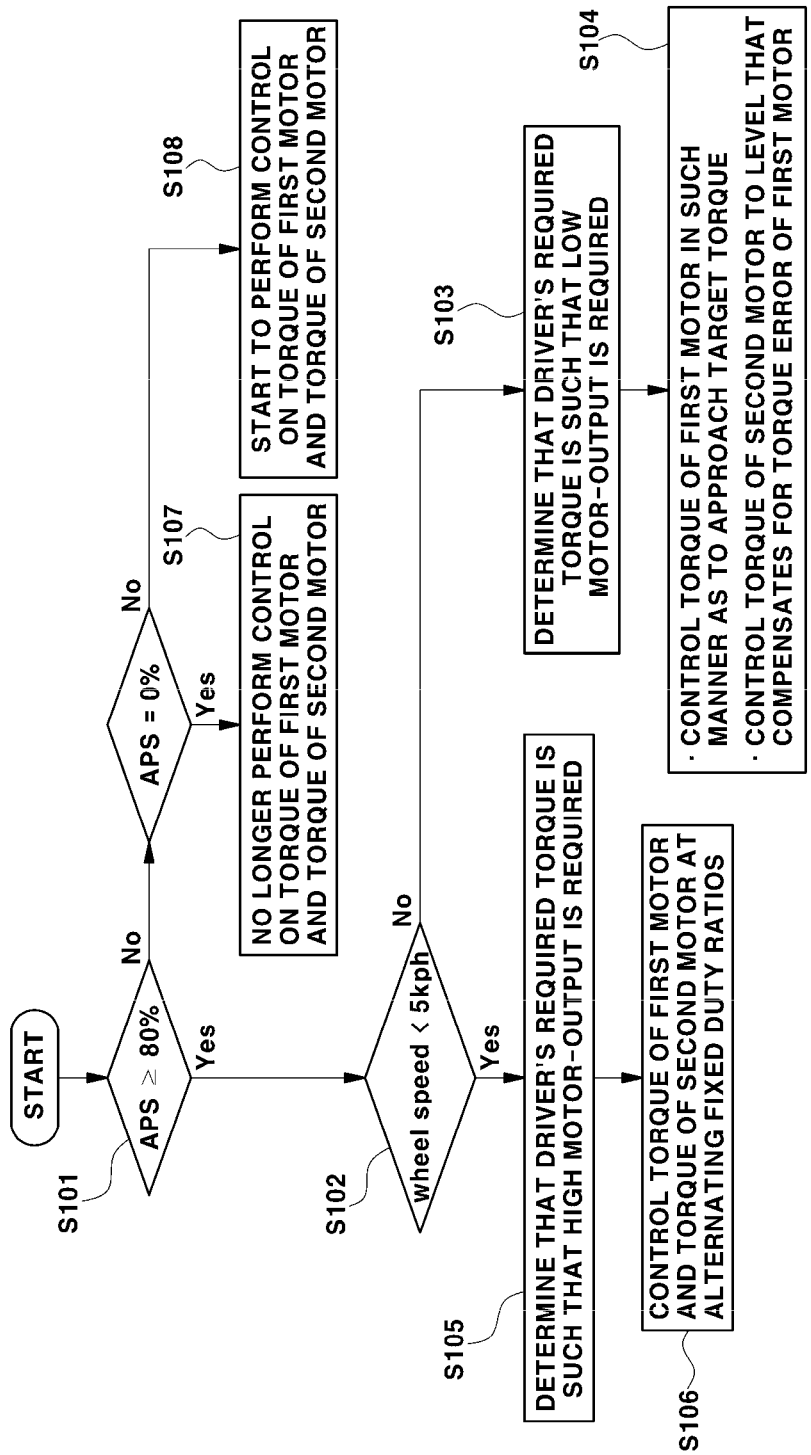
FIG. 7 is a flowchart illustrating a motor control method for a commercial vehicle having an electric axle according to the present disclosure.
Figure 8:
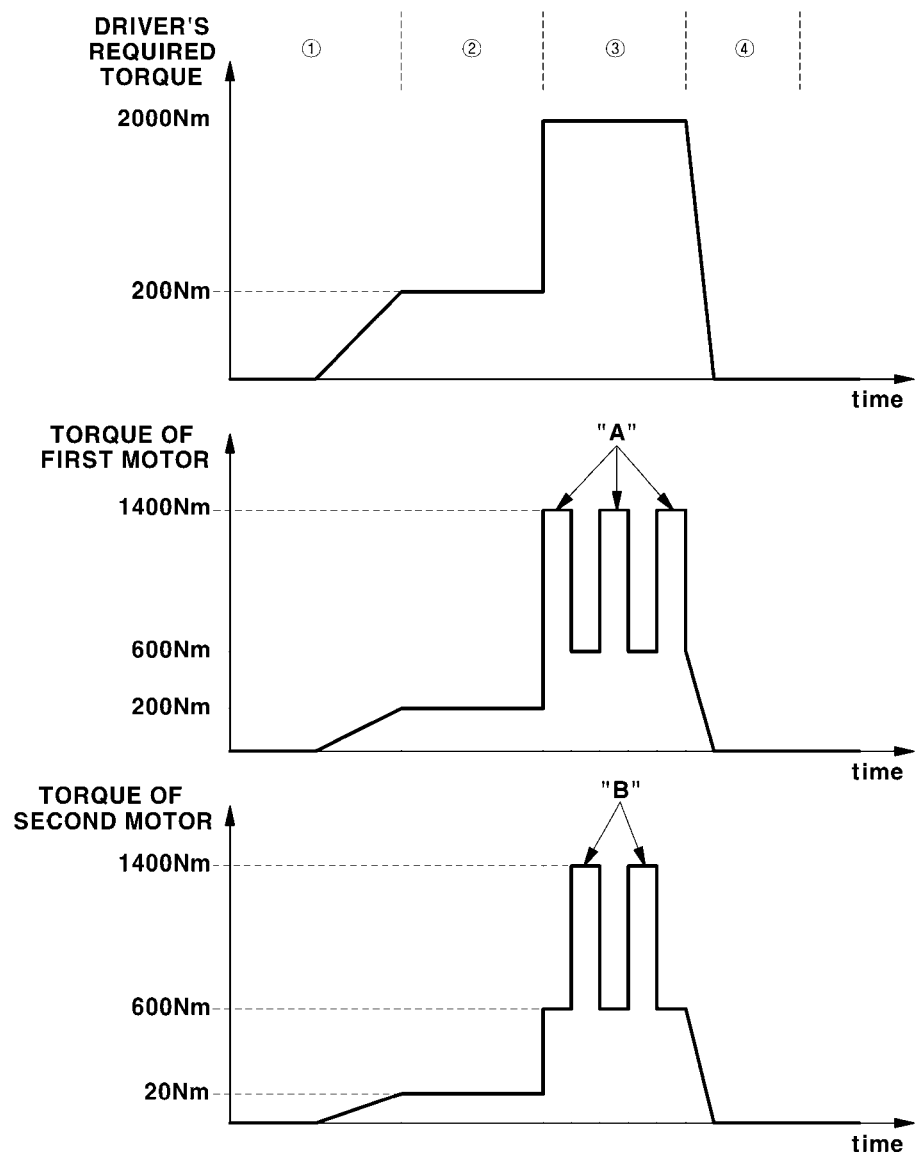
FIG. 8 is a graph illustrating an example where the torque control is performed on the first motor and the second motor that are included in the electric axle according to the present disclosure.
Figure 9:
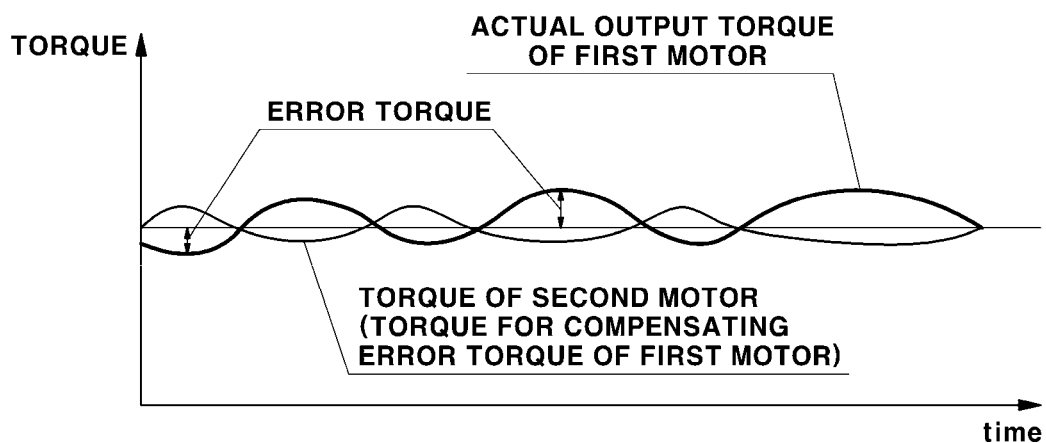
FIG. 9 is a graph illustrating an example where, in a low-output requirement section, torque error compensation control is performed on the first motor and the second motor that are included in the electric axle according to the present disclosure.

FIG. 7 is a flowchart illustrating the motor control method for the commercial vehicle having the electric axle according to the present disclosure. FIG. 8 is a graph illustrating an example where the torque control is performed on the first motor 11 and the second motor 21 that are included in the electric axle according to the present disclosure. FIG. 9 is a graph illustrating an example where, in the low-output requirement section, torque error compensation control is performed on the first motor 11 and the second motor 21 that are included in the electric axle according to the present disclosure.

First, the accelerator position sensor 101 outputs to the controller 100 an electric signal that varies according to the degree or amount (%) to which the accelerator is depressed, and the wheel speed sensor 102 outputs to the controller 100 a signal that results from measuring a wheel speed.

Next, the controller 100 determines the driver's required torque and determines whether or not the determined driver's required torque is for the high-output requirement section or for the low-output requirement section.

To this end, the controller 100 determines on the basis of the electric signal of the accelerator position sensor 101 whether or not the degree (%) to which the accelerator is depressed is at or above a reference value (for example, 80%) (S101), and determines on the basis of the signal of the wheel speed sensor 102 whether or not a wheel speed exceeds a reference speed (for example, 5 kph) (S102).

When the result of the determination in Step S101 is that the degree (%) to which the accelerator is depressed is at or above the reference value (for example, 80%) and the result of the determination in Step S102 is that the wheel speed exceeds the reference speed, the controller 100 determines that the magnitude of the driver's required torque is such that a low motor-output (low motor-torque) is required (S103).

Accordingly, when determining that the magnitude of the driver's required torque is such that the low motor-output (low motor-torque) is required, the controller 100 controls the torque of the first motor 11 included in the rear-wheel electric axle in such a manner as to approach the target torque for satisfying the driver's required torque and at the same time controls the torque of the second motor 21 included in the rear-wheel electric axle to a level that compensates for the torque error of the first motor 11 (S104).

For example, when the driver's required torque is in a low motor-output section of 200 Nm indicated by ② in FIG. 8, the torque of the first motor 11 is controlled to 200 Nm in such a manner as to approach the target torque for satisfying the driver's required torque. At the same time, the torque of the second motor 21 is controlled to 20 Nm in such a manner as to compensate for the torque error of the first motor 11.

More specifically, as illustrated in a graph in FIG. 9, an actual output torque of the first motor 11 includes the error torque (approximately, 20 Nm) that is a distance somewhat away from the target torque for satisfying the driver's required torque. In order to compensate for this error torque, as illustrated in FIG. 9, the torque (approximately, 20 Nm) of the second motor 21 is controlled to a level that compensates from the torque error of the first motor.

Therefore, in the low-output requirement section for the motor, the torque of the first motor 11 included in the rear-wheel electric axle is controlled in such a manner as to approach the target torque for satisfying the driver's required torque. At the same time, the torque of the second motor 21 included in the rear-wheel electric axle is controlled to a level that compensates for the torque error of the first motor 11. Thus, the torque of the first motor 11 and the torque of the second motor 21 are exactly output in such a manner as to reach the target torque for satisfying the driver's required torque.

Conversely, when the result of the determination in Step S101 is that the degree (%) to which the accelerator is depressed is at or above the reference value (for example, 80%) and the result of the determination in Step S102 is that the wheel speed is lower than the reference speed, it is determined that the magnitude of the driver's required torque is such that a high motor-output is required (S105).

For example, when the degree (%) to which the accelerator is depressed is at or above the reference value (for example, 80%) and the wheel speed is lower than the reference speed, it is determined that the magnitude of the driver's required torque is necessary for a maximum torque usage section (for example, a section for starting to drive on an uphill road or a section for starting to drive for safety) for the motor.

Accordingly, when it is determined that the magnitude of the driver's required torque is such that the high motor-output (high motor-torque) of the motor is required, the controller 100 controls the torque of the first motor 11 and the torque of the second motor 21 at the alternating fixed duty ratios, with the first motor 11 and the second motor 21 being included in the rear-wheel electric axle (S106).

At this point, when controlling the torque of the first motor 11 and the torque of the second motor 21 at the alternating fixed duty ratios, the controller 100 performs the control in such a manner that the sum of the torque of the first motor 11 and the torque of the second motor 21 becomes the driver's required torque.

For example, in a high motor-output section indicated by ③ in FIG. 8, when the driver's required torque is 2000 Nm, the torque of the first motor 11 is controlled at a duty ratio that alternates between 1400 Nm and 600 Nm, and the torque of the second motor 21 is controlled at a duty ratio that alternates between 600 Nm and 1400 Nm. Thus, the sum of the torque of the first motor 11 and the torque of the second motor 21 becomes 2000 Nm, thereby satisfying a driver's required torque of 2000 Nm.

Therefore, in the high-output requirement section for the motor, the torque of the first motor 11 and the torque of the second motor 21 are controlled at the alternating fixed duty ratios. Thus, not only can the driver's required torque be satisfied, but also a maximum-torque usage time for each of the first motor 11 and the second motor 21 can be increased more than in the related art.

More specifically, in the related art, when a loaded vehicle parked on an uphill road starts to drive after ignition, both the first motor 11 and the second motor 21 are driven at maximum torque, and thus maximum torque can be used only for a short time (approximately 30 seconds). However, according to the present disclosure, the torque of the first motor 11 and the torque of the second motor 21, as described above, are controlled at the alternating fixed duty ratios, and thus the maximum-torque usage time of each of the first motor 11 and the second motor 21 for satisfying the driver's required torque can be increased more than in the related art.

When the torque of the first motor 11 and the torque of the second motor 21 are controlled at the alternating fixed duty ratios, a maximum-torque period (indicated by "A" in FIG. 8) for the first motor 11 and a maximum-torque period (indicated by "B" in FIG. 8) for the second motor 21 are required to be determined by experiment as being shorter than the time taken for a temperature of each motor to reach a maximum reference temperature for motor protection.

Accordingly, the temperature of each of the first motor 11 and the second motor 21 does not reach the maximum reference temperature for motor protection. Thus, the first motor 11 and the second motor 21 can be protected, and the durability thereof can be improved.

When the result of the determination in Step S101 is that the degree (%) to which the accelerator is depressed is below the reference value (for example, 80%) and that the degree (%) to which the accelerator is depressed is not zero, as in a section indicated by ① in FIG. 8, the torque control that, with a predetermined slope, increases the torque of the first motor 11 and the torque of the second motor 21 to a point for satisfying the driver's required torque is started to be performed.

Conversely, when a driver depresses the accelerator and thus the degree (%) to which the accelerator is depressed becomes zero, as in a section indicated by ④ in FIG. 8, the torque control is no longer performed on the first motor 11 and the second motor 21.

In this manner, the torque of each of the first motor 11 and the second motor 21 that are included in the rear-wheel electric axle can be easily controlled to the level that satisfies the driver's required torque in the low-output requirement section, the high-output requirement section, and the like. Moreover, only the first motor 11 may be employed as a model that is high-priced and has high performance and high precision. Additionally, the second motor 21 may be employed as a model that is lower-priced and has lower precision than the first motor 11, in such a manner as to output the torque for compensating for the torque error of the first motor 11. Thus, the cost saving can be achieved in developing and manufacturing commercial vehicles such as hydrogen fuel cell truck.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A motor control system for a commercial vehicle having an electric axle, the motor control system comprising:
　　a first motor and a second motor disposed in a rear-wheel electric axle;
　　an accelerator position sensor configured to detect a degree to which an accelerator is depressed;
　　a wheel speed sensor configured to detect a wheel speed change; and
　　a controller configured to:
　　　　determine a driver's required torque based on detection signals of the accelerator position sensor and the wheel speed sensor, respectively, and
　　　　control a first motor torque of the first motor to approach a target torque for satisfying the driver's required torque while either controlling a second motor torque of the second motor to a level that compensates for a torque error of the first motor or controlling the first motor torque and the second motor torque at alternating fixed duty ratios,
　　wherein, when the first motor torque and the second motor torque are controlled at the alternating fixed duty ratios, a maximum-torque period for the first motor and a maximum-torque period for the second motor are determined as being shorter than a time taken for a temperature of each motor to reach a maximum reference temperature.

2. The motor control system of claim 1, wherein the controller comprises:
　　a vehicle controller determining the driver's required torque based on the detection signal of the accelerator position sensor and then applying a motor torque command for satisfying the driver's required torque; and
　　a motor controller receiving the motor torque command from the vehicle controller and configured to control the first motor torque based on the motor torque command to approach the target torque while either controlling the second motor torque to the level that compensates for the torque error of the first motor or controlling the first motor torque and the second motor torque at the alternating fixed duty ratios.

3. The motor control system of claim 1, wherein, in a low-output requirement section, the controller controls the first motor torque to approach the target torque while controlling the second motor torque to the level that compensates for the torque error of the first motor.

4. The motor control system of claim 1, wherein, in a high-output requirement section, the controller controls the first motor torque and the second motor torque at the alternating fixed duty ratios.

5. The motor control system of claim 4, wherein, when controlling the torque of the first motor and the torque of the second motor at the alternating fixed duty ratios, the controller controls a sum of the torque of the first motor and the torque of the second motor to become the driver's required torque.

6. The motor control system of claim 1, wherein, in a case where the rear-wheel electric axle includes a first rear-wheel electric axle having the first motor and a second rear-wheel electric axle having the second motor, the controller controls the first motor as a high-precision motor to have a precision higher than that of the second motor and to output the target torque, and controls the second motor as a low-precision motor to have a precision lower than that of the first motor and to output a torque for compensating for the torque error of the first motor.

7. The motor control system of claim 1, wherein, in a case where the rear-wheel electric axle is configured as one electric axle having the first motor and the second motor, the controller controls the first motor as a high-precision motor to have a higher precision than the second motor and to output the target torque, and controls the second motor as a low-precision motor to have a lower precision than the first motor and to output a torque for compensating for the torque error of the first motor.

8. A motor control method for a commercial vehicle having an electric axle, the method comprising:
　　detecting, by an accelerator position sensor, a degree to which an accelerator is depressed;
　　detecting, by a wheel speed sensor, a wheel speed change;
　　determining, by a controller, a driver's required torque based on detection signals of the accelerator position sensor and the wheel speed sensor, respectively; and
　　upon determining the driver's required torque, controlling, by the controller, a first motor torque of a first motor disposed in a rear-wheel electric axle to approach a target torque for satisfying the driver's required torque, according to a magnitude of the determined driver's required torque while either controlling a second motor torque of a second motor disposed in the rear-wheel electric axle to a level that compensates for a torque error of the first motor or controlling the first motor torque and the second motor torque at alternating fixed duty ratios,
　　wherein, when the first motor torque and the second motor torque are controlled at the alternating fixed duty ratios, a maximum-torque period for the first motor and a maximum-torque period for the second motor are determined as being shorter than a time taken for a temperature of each motor to reach a maximum reference temperature.

9. The motor control method of claim 8, wherein, in a case where the magnitude of the driver's required torque is in a low motor-output upon determining the driver's required torque, the controller controls the first motor torque to be the target torque while controlling the second motor torque to be the level that compensates for the torque error of the first motor.

10. The motor control method of claim 8, wherein when the magnitude of the driver's required torque is in a high motor-output, the controller controls the first motor torque and the second motor torque at the alternating fixed duty ratios.

11. The motor control method of claim 10, wherein, when the first motor torque and the second motor torque are controlled at the alternating fixed duty ratios, the controller controls a sum of the first motor torque and the second motor torque to become the driver's required torque.

12. A motor control system for a commercial vehicle having an electric axle, the motor control system comprising:
　　a first motor and a second motor disposed in a rear-wheel electric axle;
　　an accelerator position sensor configured to detect a degree to which an accelerator is depressed;
　　a wheel speed sensor configured to detect a wheel speed change; and a controller configured to:
- determine a driver's required torque based on detection signals of the accelerator position sensor and the wheel speed sensor, respectively, and
- control a first motor torque of the first motor to approach a target torque for satisfying the driver's required torque while either controlling a second motor torque of the second motor to a level that compensates for a torque error of the first motor when an actual output torque of the first motor includes the torque error that is a distance away from the target torque for satisfying the driver's required torque, or controlling a maxim-torque period for the first motor and a maximum-torque period for the second motor at alternating fixed duty ratios.

* * * * *